Figure 1:
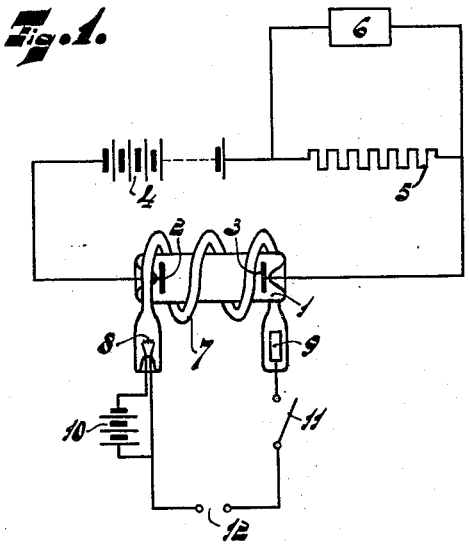

May 18, 1937.  F. M. PENNING ET AL  2,080,926
LIGHT SENSITIVE DEVICE
Filed May 20, 1931

Inventors.
Frans Michel Penning and Marinus Jacobus Jansen
By
Attorney.

Patented May 18, 1937

2,080,926

UNITED STATES PATENT OFFICE 2,080,926

LIGHT SENSITIVE DEVICE

Frans Michel Penning and Marinus Jacobus Jansen, Eindhoven, Netherlands, assignors, by mesne assignments, to General Electric Company, a corporation of New York Application May 20, 1931, Serial No. 538,832
In the Netherlands May 30, 1930

6 Claims. (Cl. 250—41.5)

This invention relates to a method of influencing the current or the potential in an electric circuit by means of radiation.

For converting light variations into electric current variations different devices, for example, photoelectric and selenium cells, have already been resorted to. These devices are used inter alia in installations for transmitting images by telegraphy or by radio-telegraphy or for the reproduction of recorded sound vibrations.

In United States Letters Patent 1,958,066, issued May 8, 1934 to inventor Frans Michel Penning, it was proposed to convert light variations into electric current or voltage variations by means of an electric discharge tube containing a gas or vapour (main gas), the atoms or molecules of which can be in metastable condition, and a small quantity of some other gas or vapour (auxiliary gas), the atoms (molecules) of which can be ionized by the metastable atoms of the main gas. Between the electrodes of this discharge tube a potential is set up, due to which the atoms (molecules) of the main gas are transferred into a metastable state. By "metastable atom", or the "metastable state or condition" of an atom is meant an atom in an excited state from which a return to the fundamental, normal, or unexcited state of the atom does not take place spontaneously. The metastable state of the atom persists until some external influence brings the atom to a different state. The metastable state of the atom can persist therefore, longer than other excited states of the atom which usually last for an interval of $10^{-3}$ to $10^{-5}$ seconds. These metastable atoms (molecules) ionize atoms of the small quantity of the auxiliary gas present, owing to which a current of definite strength passes through the discharge tube. When this discharge tube is irradiated by means of light containing frequencies which can be absorbed by the metastable atoms (molecules) of the main gas, then the conductivity of the discharge tube decreases since the radiation of the metastable atoms (molecules) transfers such atoms into a non-metastable state of higher energy. By "a non-metastable state" of the atom is meant an excited state from which the atom returns spontaneously to the normal or unexcited state thereof with the emission of radiation. The duration of this non-metastable state is so short as pointed out heretofore, that the probability of a collision with an atom (molecule) of the auxiliary gas is extremely small. This results in a decrease of the ionization and of the discharge current or in an increase of the potential of the discharge.

The present invention relates to an improved method of influencing the current or the potential in an electric circuit by means of radiation, which method is essentially distinct from the method outlined above.

According to the invention an electric discharge tube in which the discharge is established in a pure gas or vapour (main gas), whose atoms (molecules) can be in metastable condition, is irradiated by light containing rays of frequencies which can be absorbed by the metastable atoms (molecules), the intensity of these rays being such that the conductivity of the gas decreases. The strength of the current passing through the discharge tube decreases as the intensity of the light used for irradiating the discharge tube increases.

This phenomenon may be explained as follows. In the method of the present invention an atom (molecule) of the gas or vapour is first brought into a metastable state by an electron and is thereupon ionized from this state by a second electron.

The discharge is then irradiated with light containing rays which are absorbed by the metastable atoms (molecules) a number of these metastable atoms (molecules) are thus transferred into a non-metastable condition of higher energy. The duration of this non-metastable state is very short, much shorter than the metastable state, as pointed out heretofore, so that the probability of the non-metastable atoms (molecules) being ionized by electrons is extremely small. Consequently they do not contribute to the discharge current as they would have had they remained in the metastable state, and therefore the strength of this current is smaller or when the current is maintained constant the voltage set up between the electrodes of the tube is greater than in case the discharge is not irradiated.

It will be obvious that the gas or the vapour with which the discharge tube is filled, may have added to it some other gas or vapour the atoms (molecules) of which cannot be ionized by metastable atoms (molecules) of the main gas. By the admixture of such a gas or vapour the working of the discharge tube is not essentially altered. When adding a small percentage of a gas the atoms (molecules) of which can be ionized by the metastable atoms (molecules) of the main gas, the working of the discharge tube is altered and in this case the effect may be obtained which was already found formerly by applicant and which is referred to above.

The discharge tube may be irradiated to advantage with light generated by an electric discharge established in a gas- or vapour-filling containing the gas or the vapour with which the discharge tube is filled.

The discharge tube whose current intensity or potential must be varied and the discharge tube in which the light serving for irradiating the first mentioned tube is generated may be lodged with advantage in one discharge tube. In this case the tube is furnished with two discharge paths and shaped in such manner that the light generated in one of the paths may serve for irradiating the other discharge path.

The variation of the current intensity produced when irradiating the discharge tube, may be observed in various ways, for example, by means of a sensitive current meter connected in series with the discharge tube. It is also possible to connect a large resistance in series with this discharge tube and to observe the voltage variations produced between the ends of this resistance at variations of the discharge current, by means of an instrument reacting to potential differences which instrument is connected in parallel to the resistance. This instrument may also be connected in parallel to the discharge tube. Furthermore this circuit arrangement is adapted for observing voltage variations in case the current intensity is maintained constant.

The invention will be more clearly understood by reference to the accompanying drawing, representing in diagram, by way of example, two devices by means of which the method according to the invention may be carried into effect.

Figure 2:
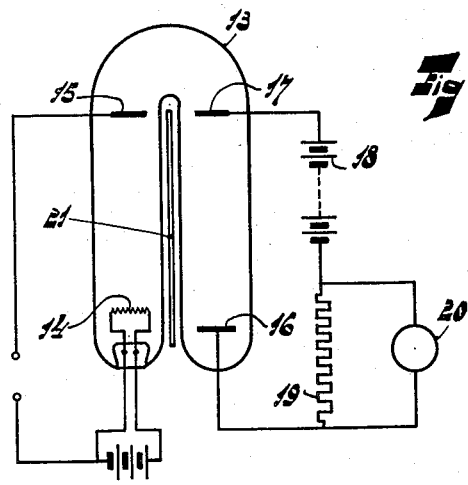

Fig. 1 of the drawing is a schematic representation of two discharge devices and a circuit diagram embodying the invention, and Fig. 2 is a similar representation and circuit diagram of another embodiment of the invention.

The device shown in Fig. 1 comprises a discharge tube 1 filled with neon i. e. a gas the atoms of which can be in metastable condition. The pressure of the neon is about 1.5 mm. Within the tube are provided two electrodes 2 and 3 consisting of small metal plates. These electrodes are connected to both terminals of a source of potential 4 and a resistance 5 is connected in series with this source of potential. A device 6 which is sensitive to the voltage variations occurring between the ends of the resistance 5 is connected in parallel to this resistance.

The discharge tube 1 is surrounded by a helical discharge tube 7 which is filled with neon and furnished with an incandescent cathode 8 and an anode 9. The incandescent cathode 8 is fed from a current source 10, whereas the discharge tube 7 is connected to a current source 12 with the interposition of a switch 11.

During operation of the device a positive column discharge is established within the discharge tube 1 between the electrodes 2 and 3. The electrical characteristics of the current source 4 and the resistance 5 as well as of the discharge tube 1 determines the value of the discharge current in said tube 1. If the discharge tube 7 is energized, for example, by closing the switch 11, so that the discharge tube 1 is irradiated with neon light, then the light is absorbed by the metastable atoms produced within the discharge tube 1, due to which these atoms are brought into a non-metastable state of higher energy. These atoms soon return spontaneously to the fundamental, or unexcited state, in which state they do not assist in carrying the discharge current, so that the probability of these atoms being ionized by electrons is smaller than would be the case had they remained in the metastable state. Consequently the irradiation of the discharge tube 1 with the light emitted by the discharge tube 7 results in a decrease of the strength of the current passing through the discharge tube 1 since the total number of atoms in the excited states is reduced and the potential difference set up by the discharge current between the ends of the resistance 5, decreases. Applicant has found a decrease of the current intensity from 3 to 2 milliamperes owing to which a voltage variation of 17 volts was produced in a series resistance of 17000 ohms.

When it is desired to keep the current intensity constant in the circuit comprising the discharge tube to be irradiated a saturated diode may be inserted in this circuit. Upon irradiation of the discharge a number of the atoms which are in the metastable state will be transferred back again into the fundamental state without having participated in the discharge current. Consequently the potential prevailing between the electrodes of the discharge tube will be greater than in case the discharge is not irradiated. This high potential produces again an equal current intensity. If, for example, a discharge current of 2 milliamperes is kept constant an increase of the potential prevailing between the electrodes from 60 to 85 volts has been observed.

It will be obvious that instead of using neon the discharge tube 1 may be filled also with some other gas or vapour of which the atoms (molecules) can be in metastable condition. Furthermore it is possible that the gas or vapour contained in the discharge tube 1 has added to it some other suitable gas or vapour. The neon filling of the tube 1 may have added to it, for example, a quantity of helium, i. e. a gas the atoms of which cannot be ionized by metastable neon atoms.

It may be desirable to provide the discharge tube with an incandescent cathode, which permits the potential between the electrodes to be chosen materially smaller, due to which the voltage variations will be relatively greater.

The device shown in Fig. 1 serves as a relay for reacting to variations occurring in the circuit of the discharge tube 7. However, the invention may be used for many other purposes, for example, for the reproduction of phenomena recorded on film bands. If it is desired, for example, to transmit by radio-telegraphy a film band which is provided with light and dark spots in form of Morse signals, this may be effected by means of the method according to the invention. In this case the discharge tube 1 is covered with a screen, in which a slit is provided, the film to be transmitted is passed along over this slit and a light source which emits light containing rays of frequencies which can be absorbed by the metastable atoms of the gas contained in the discharge tube 1 is mounted above the film in line with the slit. Consequently the exposure of the discharge tube will depend on the transparency of the part of the film above the slit of the screen. The intensity of the current passing through the discharge tube 1 thus will vary in accordance with the signs recorded on the film band. This varying current may be transmitted in known manner.

The device shown in Fig. 2 comprises a U-shaped discharge tube 13 which is filled with neon. In each limb is arranged a pair of electrodes. Between the electrodes 14 and 15 a luminous discharge may be established by means of which the discharge path between the electrodes 16 and 17 may be irradiated. These electrodes are connected to a current source 18 and a resistance 19, whereas a voltmeter 20 is connected in parallel to this resistance. The discharge path between the electrodes 16 and 17 corresponds to the discharge tube 1 shown in Fig. 1, whereas the discharge tube 7 of Fig. 1 is equivalent to the discharge path between the electrodes 14 and 15. If desired, the electrodes 15 and 17 may coincide. Between both limbs of the discharge tube 13 a film band 21 may be moved, so that the intensity of the exposure of the discharge path between the electrodes 16 and 17 depends on the transparency of the film band. Consequently the potential prevailing between the ends of the resistance 19 will likewise vary.

What we claim is:

1. An apparatus for influencing the resistance of an electric circuit by means of light comprising a light-sensitive element constituted by an electric discharge tube having main discharge supporting electrodes non-sensitive to light included in the circuit and containing a gaseous atmosphere consisting of light sensitive pure gas the atoms of which are adapted to assume a metastable condition, and a light source to irradiate said tube, said light principally displaying a wave length adapted to be absorbed by the gas atoms in their metastable condition, the conductivity of the gas in said discharge tube being an inverse function of the intensity of the light from said source irradiating said tube.

2. An apparatus for influencing the resistance of an electric circuit by means of light comprising a light-sensitive element constituted by an electric discharge tube having main discharge supporting electrodes non-sensitive to light included in the circuit and containing a gaseous atmosphere consisting of light sensitive pure gas the atoms of which are adapted to assume a metastable condition, and a light source to irradiate said tube, said light principally displaying the wave lengths which are characteristic of the irradiation caused by an electric discharge in the gas present in said discharge tube, the conductivity of the gas in said discharge tube being an inverse function of the intensity of the light from said source irradiating said tube.

3. An apparatus for influencing the resistance of an electric circuit by means of light comprising a light-sensitive element constituted by an electric discharge tube having main discharge supporting electrodes non-sensitive to light included in the circuit and containing a gaseous atmosphere consisting of light sensitive neon, and a light source to irradiate said tube, said light principally displaying the wave lengths which are characteristic of the radiation caused by an electric discharge in neon, the conductivity of the gas in said discharge tube being an inverse function of the intensity of the light from said source irradiating said tube.

4. An apparatus for influencing the resistance of an electric circuit by means of light comprising a light-sensitive element constituted by an electric discharge tube having main discharge supporting electrodes non-sensitive to light included in the circuit and containing a light sensitive pure gas the atoms of which are adapted to assume a metastable condition, said gas having added to it a quantity of another gas, the atoms of which cannot be ionized by metastable atoms of the first-mentioned gas, and a light source to irradiate said tube, said light principally displaying the wave lengths which can be absorbed by the metastable atoms of the first-mentioned gas, the conductivity of the gas in said discharge tube being an inverse function of the intensity of the light from said source irradiating said tube.

5. In combination, a light-sensitive element constituted by an electric discharge tube having main discharge supporting electrodes non-sensitive to light and containing a gaseous atmosphere consisting of light sensitive pure gas the atoms of which are adapted to assume a metastable condition, means for irradiating said tube with light of a wave length adapted to be absorbed by the gas atoms in their metastable condition and a device connected to said tube responsive to the effect produced by such irradiation, the conductivity of the gas in said discharge tube being an inverse function of the intensity of the light from said source irradiating said tube.

6. In combination, a light-sensitive element constituted by an electric discharge tube having main discharge supporting electrodes non-sensitive to light and containing a gaseous atmosphere consisting of light sensitive pure gas the atoms of which are adapted to assume a metastable condition, means for irradiating said tube with light of a wave length adapted to be absorbed by the gas atoms in their metastable condition, means for varying the amount of irradiation of the tube by the first-mentioned means and a device connected to said tube for utilizing the variations produced by such irradiation, the conductivity of the gas in said discharge tube being an inverse function of the intensity of the light from said source irradiating said tube.

FRANS MICHEL PENNING.
MARINUS JACOBUS JANSEN.